Figure 1:
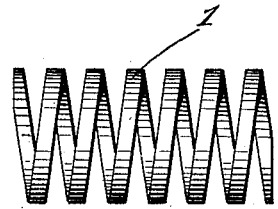

E. G. ACHESON, Jr.
BEARING.
APPLICATION FILED JAN. 31, 1921.

1,398,219.

Patented Nov. 29, 1921.

Inventor
Edward G. Acheson Jr.
By his Attorneys
Pennie Davis Marvin & Edmunds

UNITED STATES PATENT OFFICE.

EDWARD GOODRICH ACHESON, JR., OF NIAGARA FALLS, NEW YORK.

BEARING.

1,398,219.   Specification of Letters Patent.   Patented Nov. 29, 1921.

Application filed January 31, 1921. Serial No. 441,165.

*To all whom it may concern:*

Be it known that I, EDWARD G. ACHESON, Jr., a citizen of the United States, residing at Niagara Falls, in the county of Erie, State of New York, have invented certain new and useful Improvements in Bearings; and I do hereby declare the following to be a full, clear, and exact description of the invention, such as will enable others skilled in the art to which it appertains to make and use the same.

My invention is an improvement in bearings, and in methods of making the same, and relates to that type of bearing known as the self-lubricating oilless bearing, wherein segregated masses of graphite carrying material are incorporated in the bearing at the bearing surface.

An object of the invention is to provide a soft metal bearing, as for instance, a bearing of Babbitt, which will be of the self-lubricating or oilless type, having the segregated masses of fiber impregnated with pure, amorphous graphite, incorporated therein, and extending to the bearing surface to engage the element turning therein throughout its extent.

Another object is to provide a method of forming such bearings in place, by arranging fiber masses properly supported within the bearing, and pouring the molten metal around such masses.

Figure 2:
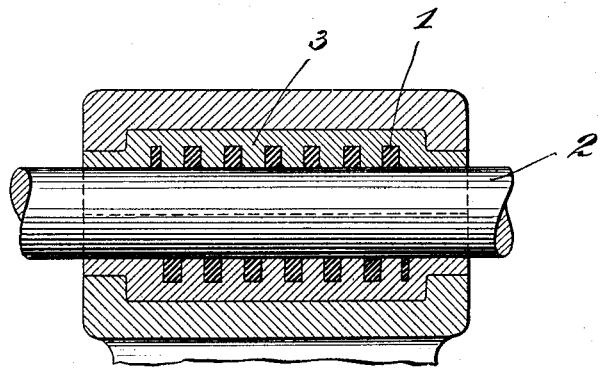
Figure 3:
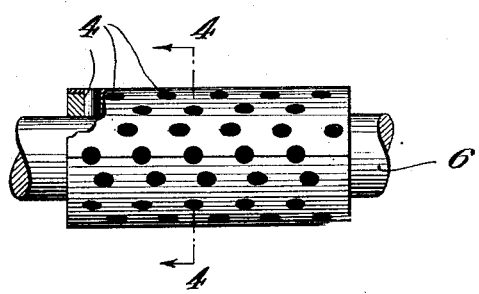
Figure 4:
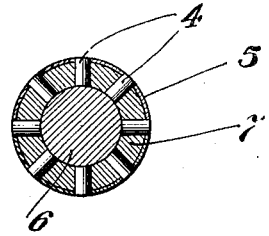

In the drawings;

Figure 1 is a plan view of a section of fiber impregnated with graphite in suitable form for carrying out the method, Fig. 2 is a longitudinal section of the completed bearing, Fig. 3 is a top plan view with parts broken away, showing another arrangement, Fig. 4 is a section on the line 4—4 of Fig. 3.

The type of bearing known as the self-lubricating or oilless bearing, has the bearing surface thereof inlaid with a lubricating material. The lubricating material, as for instance graphite, with a relatively large portion of bonding material, is packed in grooves or trenches in the bearing surface of the bearing. This process requires special machinery, as for instance hydraulic presses, to pack the graphite solidly into the grooves or trenches. Hence the bearings cannot be cast in place but must be manufactured at a plant having facilities for the purpose. In the present invention vulcanized fiber impregnated with graphite, in the manner set forth in my co-pending application Serial No. 430,711, filed December 14, 1920, is arranged in suitable masses about the core of the bearing, and the molten soft metal, as for instance the alloy known as Babbitt is poured around such masses. When the metal cools, the masses are firmly held, with their bearing surfaces flush with the bearing surface of the soft metal bearing, and such masses are so distributed throughout the soft metal bearing, that every portion of the element which turns in the bearing will be engaged by such masses during the turning of the said element.

Different procedures may be used in carrying out the method. As for instance in Figs. 1 and 2, the fiber impregnated with the graphite is molded into tubes, which are afterward cut to form spiral strips 1. In casting a bearing in place, a strip of the fiber 1 of sufficient length is cut off, and the said strip is placed around the shaft or core of the bearing 2 as shown in Fig. 2, it being understood that the strip is of a cross-section suitable for the purpose. The bearing sections are now placed, and the alloy indicated at 3, of Babbitt or the like, is poured into the bearing, filling the space between the core or shaft and the bearing. The strip 1 is embedded in this alloy, with its inner surface flush with the bearing surface of the alloy. A single strip may be used, or a number of strips as may be desired, and the said strips are arranged in inclined relation with respect to the axis of the bearing, so that when the element which turns therein rotates, every portion thereof will engage the strip to lubricate the said element.

In Figs. 3 and 4 the fiber is in the form of plugs 4, which in the present instance are cylindrical, though it is obvious that they might be of any desired cross-section. These plugs are held in openings in a cage or screen 5 of metal, the inner ends of the plugs contacting with the shaft or core 6 of the bearing. The cage or screen carrying the plugs is placed within the bearing, in the same manner as the strip 1 is placed is the bearing in Fig. 2, and the alloy indicated at 7 is poured, filling the space within the cage and around the plugs. The plugs are arranged in lines extending longitudinally of the shaft or core, and the plugs of each line are staggered with respect to those of adjacent lines, and the plugs are so spaced that the plugs of each line will a little more than cover the space between two plugs of adjacent lines. The plugs are arranged in lapping relation, so that every portion of the element turning with the bearing will engage with the plugs. It will be obvious that instead of using the cage 5, the plugs might be held in openings in the bearing itself, or any other desired arrangement for holding the plugs might be used.

I claim:

1. A method of forming bearings of the self-lubricating type, which consists in casting the bearing about an inlay of vulcanized fiber impregnated with graphite.

2. A method of forming bearings of the self-lubricating type, which consists in casting the bearing about an inlay of vulcanized fiber impregnated with a lubricant.

3. A method of forming bearings of soft metal and of the self-lubricating or oilless type, which consists in supporting masses of vulcanized fiber impregnated with graphite about the core of the bearing, and in pouring the molten metal around said masses.

4. A method of forming bearings of soft metal and of the self-lubricating or oilless type, which consists in supporting masses of vulcanized fiber impregnated with graphite about the core of the bearing, in such manner, that during rotation the element turning in the bearing will contact throughout its extent with such masses, and in pouring molten metal around the masses.

5. A method of forming bearings of the character specified, which consists in supporting masses of vulcanized fiber impregnated with graphite or the like about the shaft or core in properly spaced relation, and in inserting a suitable alloy within the bearing to form a matrix for the masses.

6. A bearing of the character specified, comprising a body of soft metal and an inlay of vulcanized fiber impregnated with graphite and molded in place.

7. A bearing of the character specified, comprising a body of alloy and masses of vulcanized fiber impregnated with graphite cast in the body.

8. A bearing of the character specified, comprising a body of alloy, and an inlay of vulcanized fiber impregnated with graphite the alloy being cast around the inlay, with the bearing surface thereof substantially flush with the bearing surface of the inlay.

In testimony whereof I affix my signature.

EDWARD GOODRICH ACHESON, Jr.